United States Patent
Ishibashi et al.

(10) Patent No.: US 11,515,778 B2
(45) Date of Patent: Nov. 29, 2022

(54) POWER CONVERSION DEVICE

(71) Applicant: Mitsubishi Electric Corporation, Tokyo (JP)

(72) Inventors: Takaharu Ishibashi, Tokyo (JP); Takushi Jimichi, Tokyo (JP); Takuya Kajiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 17 days.

(21) Appl. No.: 17/047,698

(22) PCT Filed: May 16, 2018

(86) PCT No.: PCT/JP2018/018911
§ 371 (c)(1),
(2) Date: Oct. 15, 2020

(87) PCT Pub. No.: WO2019/220561
PCT Pub. Date: Nov. 21, 2019

(65) Prior Publication Data
US 2021/0159777 A1    May 27, 2021

(51) Int. Cl.
*H02M 1/32* (2007.01)
*H02M 1/00* (2006.01)

(52) U.S. Cl.
CPC .......... *H02M 1/0077* (2021.05); *H02M 1/32* (2013.01); *H02M 1/325* (2021.05)

(58) Field of Classification Search
CPC ........................ H02M 1/0077; H02M 1/325
See application file for complete search history.

(56) References Cited

U.S. PATENT DOCUMENTS 10,367,423 B1* 7/2019 Jimichi ............ H02M 3/33573
2014/0078797 A1 3/2014 Mihalache
2016/0380429 A1* 12/2016 Krstic .................... H02H 7/125
307/77

(Continued)

FOREIGN PATENT DOCUMENTS

CN 102097925 A 6/2011
CN 105743352 A 7/2016

(Continued)

OTHER PUBLICATIONS

International Search Report and Written Opinion dated Jul. 31, 2018 for PCT/JP2018/018911 filed on May 16, 2018, 6 pages with English translation of International Search Report.

(Continued)

*Primary Examiner* — Peter M Novak
(74) *Attorney, Agent, or Firm* — Xsensus LLP

(57) ABSTRACT

Provided is a power conversion device capable of continuing the transmission of power even in the event of failure of a DC-to-DC converter cell. The power conversion device according to the present invention includes: a unit having a plurality of DC-to-DC converter cells; a short-circuit device that short-circuits a failed cell; and a control circuit that controls the plurality of DC-to-DC converter cells. The control circuit controls the voltage of a second cell terminal of a healthy cell included in a unit that includes the failed cell, based on a failed cell count m, so that the power of a first cell terminal and the power of the second cell terminal are matched.

12 Claims, 11 Drawing Sheets

(56) References Cited

U.S. PATENT DOCUMENTS

2018/0123454 A1\* 5/2018 Symonds .............. H02M 3/285
2019/0058409 A1 2/2019 Ishibashi et al.
2019/0229625 A1 7/2019 Jimichi et al.

FOREIGN PATENT DOCUMENTS

| EP | 2341594 A1 | 7/2011 |
| JP | 2010-41918 A | 2/2010 |
| JP | 2010041918 A \* | 2/2010 |
| JP | 2012-217319 A | 11/2012 |
| JP | 2013-198385 A | 9/2013 |
| WO | 2017/163508 A1 | 9/2017 |
| WO | 2017/216291 A1 | 12/2017 |
| WO | 2018/051602 A1 | 3/2018 |

OTHER PUBLICATIONS

Extended European Search Report dated Apr. 7, 2021 in European Application No. 18919148.9.
Office Action dated Jul. 14, 2022, in corresponding European patent Application No. 18919148.9, 5 pages.

\* cited by examiner

POWER CONVERSION DEVICE

CROSS-REFERENCE TO RELATED APPLICATION

The present application is based on PCT filing PCT/JP2018/018911, filed May 16, 2018, the entire contents of which are incorporated herein by reference.

TECHNICAL FIELD

The present invention relates to a power conversion device which includes multiple DC-to-DC converter cells connected in series-parallel.

BACKGROUND ART

A technology is proposed in which DC-to-DC converter cells, each using a semiconductor switching element, are connected in series-parallel in a power conversion device, thereby converting a direct-current (DC) voltage to a high voltage DC voltage (for example, see PTL 1).

The above power conversion device is applied to, for example, a large power distribution and transmission system, and the voltage level of the power conversion device reaches several tens of kilovolts to several hundreds of kilovolts. The current flowing through such a power conversion device reaches several kiloamperes to several tens of kiloamperes. Thus, DC-to-DC converter cells, using semiconductor switching elements, are connected in series or in parallel.

CITATION LIST

Patent Literature

PTL 1: European publication No. 2341594

SUMMARY OF INVENTION

Technical Problem

Although the power conversion device disclosed in PTL 1 is expected to be applied to a large power transmission system, PTL 1 fails to thoroughly consider causing the power conversion device to continue the operation, in the event of failure of a DC-to-DC converter cell included in power conversion device 1, with DC-to-DC converter cells other than a failed DC-to-DC converter cell (hereinafter, may be referred to as a "failed cell").

In such a case, for example, the transmission of power from the power conversion device stops, ending up the entirety of the power distribution and transmission system, including the power conversion device, being stopped.

The present invention is made in view of the above, and an object of the present invention is to provide a power conversion device that is capable of continuing the transmission of power even in the event of failure of a DC-to-DC converter cell.

Solution to Problem

A power conversion device according to the present invention is a power conversion device that includes a unit between a first terminal and a second terminal, and transmits a power between the first terminal and the second terminal. The unit includes a plurality of DC-to-DC converter cells, the first terminal being located on a first side, the second terminal being located on a second side. The first side is one of an input and an output. The second side is the other one of the input and the output. The power conversion device includes a short-circuit device that short-circuits a failed cell which is a failed DC-to-DC converter cell among the plurality of DC-to-DC converter cells, and a control unit that controls the plurality of DC-to-DC converter cells. The unit has a first unit terminal on the first side of the unit and a second unit terminal on the second side of the unit. The plurality of DC-to-DC converter cells included in the unit have first cell terminals connected in parallel to the first unit terminal of the unit, and second cell terminals connected in series to the second unit terminal of the unit. The first cell terminals are on the first side, and the second cell terminals are on the second side. When the failed cell is sensed in the unit, the control unit calculates a control command value for a voltage of the second cell terminal based on a failed cell count so that a power of the first cell terminal and a power of the second cell terminal are matched in each of healthy cells which are DC-to-DC converter cells, except for the failed cell, among the plurality of DC-to-DC converter cells.

The power conversion device according to the present invention is capable of continuing the transmission of power even if a DC-to-DC converter cell is failed during the continuous operation of the power conversion device.

DESCRIPTION OF EMBODIMENTS

Hereinafter, a power conversion device according to embodiments of the present invention will be described, with reference to FIGS. 1 to 11. Note that the disclosed invention is not limited to the embodiments. The embodiments can be combined as appropriate within a range in which processing contents are not contradictory. In the following, like reference signs are used to refer to like or corresponding parts, and the description will not be repeated.

A power conversion device according to the present invention includes a unit having multiple DC-to-DC converter cells, between a first terminal and a second terminal, the first terminal being located on a first side which is one of an input and an output, the second terminal being located on a second side which is the other one of the input and the output.

The power conversion device includes a short-circuit device that short-circuits a failed cell which is a failed DC-to-DC converter cell among the multiple DC-to-DC converter cells, and a control unit that controls the multiple DC-to-DC converter cells.

The unit further has a first unit terminal on the first side of the unit, and a second unit terminal on the second side of the unit.

The multiple DC-to-DC converter cells, included in the unit, have first cell terminals connected in parallel to the first unit terminal of the unit, and second cell terminals connected in series to the second unit terminal of the unit, the first cell terminals being on the first side, the second cell terminals being on the second side.

If a failed cell is sensed, the control unit calculates a control command value for a voltage of the second cell terminal based on a failed cell count so that a power of the first cell terminal and a power of the second cell terminal are matched in each of healthy cells of the unit which are DC-to-DC converter cells, except for the failed cell.

Note that the "match" in the above refers to multiple values being equal within a predetermined error range, and may be represented as "equal" in the following description.

Embodiment 1

Figure 1:
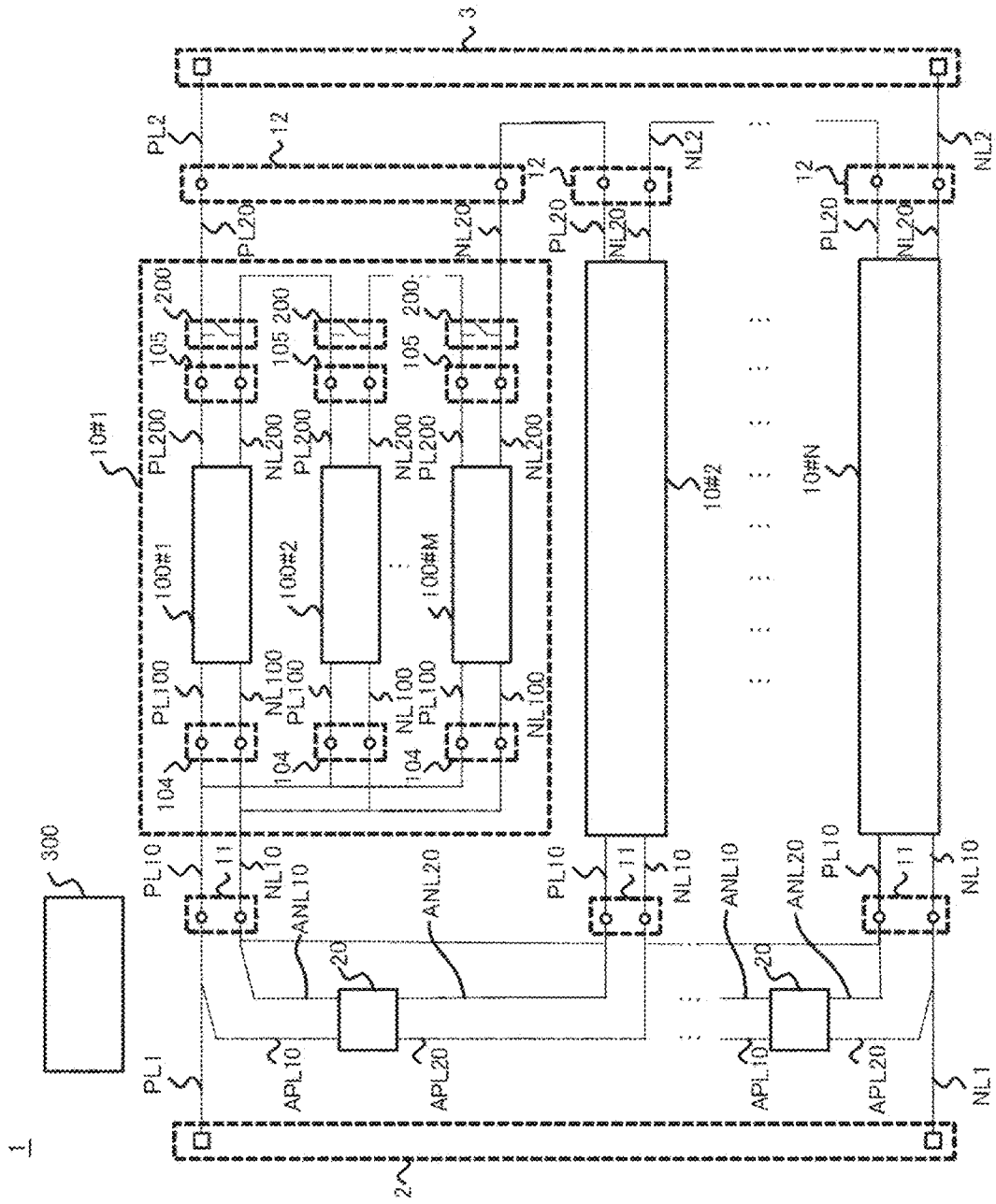
FIG. 1 is a diagram illustrating one example configuration of a power conversion device according to Embodiment 1 of the present invention.

FIG. 1 is a circuit diagram showing one example configuration of a power conversion device 1 according to Embodiment 1 of the present invention. The configuration shown in FIG. 1 is by way of example, and power conversion device 1 may be any device that uses a DC-to-DC converter cell (hereinafter, may be referred to simply as a "cell").

In FIG. 1, power conversion device 1 converts power between a first DC terminal 2 and a second DC terminal 3 of power conversion device 1. First DC terminal 2 includes a positive terminal and a negative terminal, in which the positive terminal is connected to a positive electrode power supply line PL1, and the negative terminal is connected to a negative electrode power supply line NL1. Similarly, second DC terminal 3 includes a positive terminal and a negative terminal, in which the positive terminal is connected to a positive electrode power supply line PL 2, and the negative terminal is connected to a negative electrode power supply line NL2.

Power conversion device 1 includes multiple units 10#1 to 10#N (hereinafter, may be referred to simply as a "unit 10" when collectively referred to). Each unit 10 converts power between a DC terminal 11 and a DC terminal 12 of the unit 10.

DC terminal 11 includes a positive terminal and a negative terminal, in which the positive terminal is connected to a positive electrode power supply line PL10, and the negative terminal is connected to a negative electrode power supply line NL10. Similarly, DC terminal 12 includes a positive terminal and a negative terminal, in which the positive terminal is connected to a positive electrode power supply line PL 20, and the negative terminal is connected to a negative electrode power supply line NL20.

Unit 10 has multiple cells 100#1 to 100#M (hereinafter, may be referred to simply as a "cell 100" when collectively referred to). Cell 100 converts power between a DC terminal 104 and a DC terminal 105 of the cell 100.

Hereinafter, DC terminal 11 of the unit may be referred to as a "first unit terminal 11," and DC terminal 12 of the unit may be referred to as a "second unit terminal 12." Furthermore, DC terminal 104 of cell 100 may be referred to as a "first cell terminal 104," and DC terminal 105 of cell 100 may be referred to as a "second cell terminal 105."

DC terminal 104 includes a positive terminal and a negative terminal, in which the positive terminal is connected to a positive electrode power supply line PL100, and the negative terminal is connected to a negative electrode power supply line NL100. Similarly, DC terminal 105 includes a positive terminal and a negative terminal, in which the positive terminal is connected to a positive electrode power supply line PL 200, and the negative terminal is connected to a negative electrode power supply line NL200.

In the following, for ease of description, "positive electrode power supply line PL10," "negative electrode power supply line NL10," "positive electrode power supply line PL 20," and "negative electrode power supply line NL20" may be simply referred to as "PL10," "NL10," "PL 20," and "NL20," respectively. Similarly, "positive electrode power supply line PL100," "negative electrode power supply line NL100," "positive electrode power supply line PL 200," and "negative electrode power supply line NL200" may be simply referred to as "PL100," "NL100," "PL 200," and "NL200," respectively.

Circuit structures with respect to unit 10 and cell 100 in power conversion device 1 according to the present embodiment, are now briefly described. The following description is given with reference power conversion device 1 that includes N units 10, each unit 10 including M cells 100, the power conversion device 1 including a total of (M×N) cells 100. However, the number of units 10 and the number of cells 100 are not limited to the above example. For example, while M and N each being 3 or more are shown in the figures, M and N may be 2. Power conversion device 1 may include only one unit 10.

N units 10 are connected in series on the DC terminal 2 side and the DC terminal 3 side of power conversion device 1. In each of N units 10, M cells 100 are connected in parallel on the first unit terminal 11 side. Meanwhile, M cells 100 are connected in series on the second unit terminal 12 side.

Connecting the cells 100 in series or in parallel as shown in FIG. 1 enables the power conversion device 1 to handle a high voltage and a large current. Connecting the cells 100 in series enables the power conversion device 1 to handle a high voltage. In other words, an increased capacity of the power conversion device is allowed.

Figure 2:
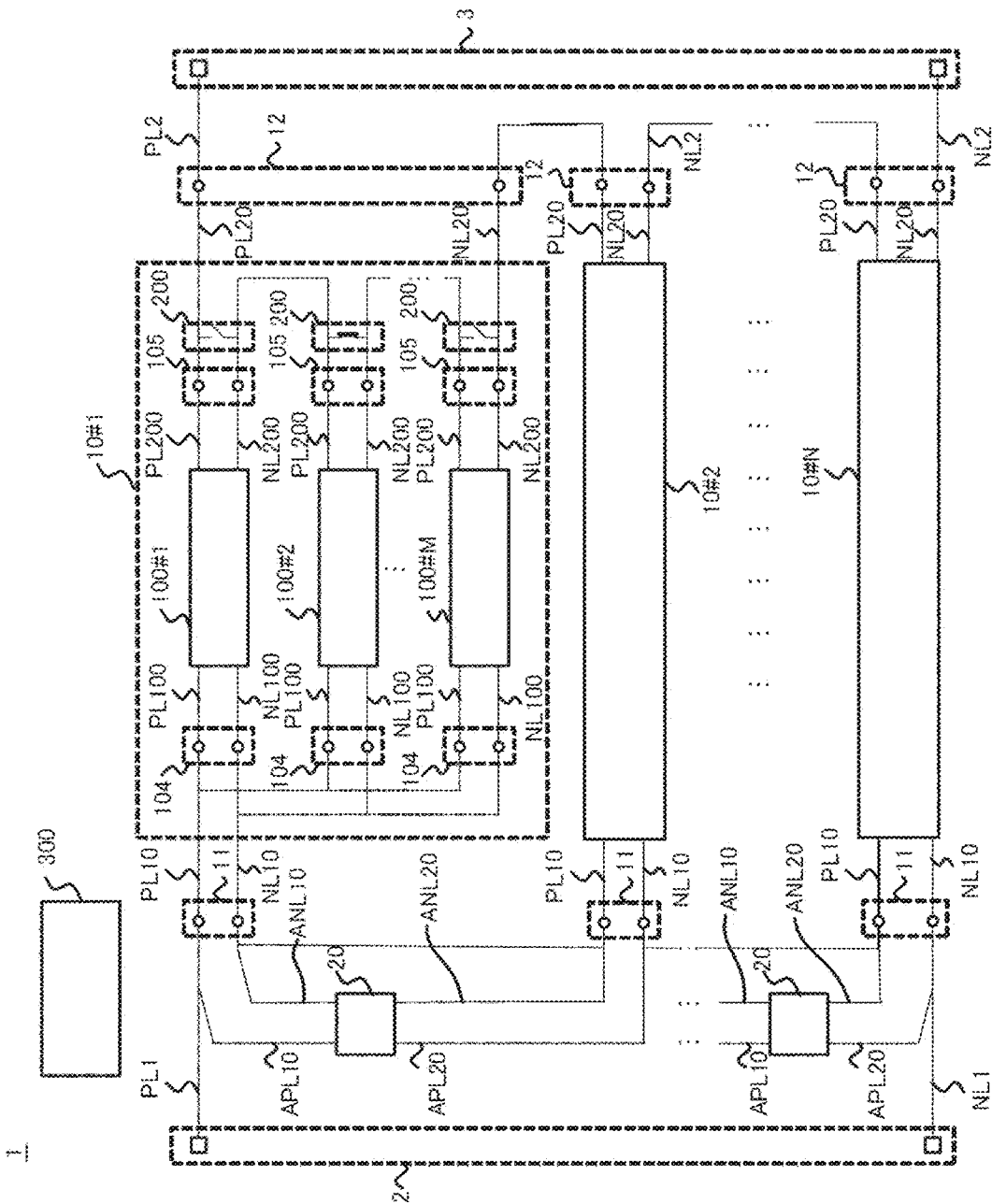
FIG. 2 is a diagram illustrating one example configuration of the power conversion device in the event of failure of a cell, according to Embodiment 1 of the present invention.

Furthermore, DC terminal 105 is connected to a short-circuit device 200 in parallel. Short-circuit device 200 is normally opened. Short-circuit device 200 is provided on the output side of cell 100. If cell 100 is failed, short-circuit device 200 is closed, for example, as shown in FIG. 2. FIG. 2 is a diagram illustrating one example configuration of power conversion device 1 in the event of failure of a cell in Embodiment 1 according to the present invention. FIG. 2 shows a case in which cell 100#2 of unit 10#1 is failed and short-circuit device 200 for cell 100#2 is closed.

Here, the circuit structures of unit 10 and cell 100 are specifically described. As mentioned above, DC terminals 11 of units 10 are connected in series in power conversion device 1. More specifically, in power conversion device 1, PL1 and PL10 of unit 10#1 are connected, and NL10 of unit 10#1 and PL10 of unit 10#2 are connected. Note that unit #3 and so on are connected in the same manner as the above, and thus the description is not repeated.

Moreover, NL10 of N-th unit 10#N, which is unit 10 at the bottom of the figure, is connected to NL1 of power conversion device 1.

In power conversion device 1, DC terminals 12 of units 10 are connected in series. More specifically, PL 2 of power conversion device 1 and PL 20 of unit 10#1 are connected. NL20 of unit 10#1 and PL 20 of unit #2 are connected. Note that unit #3 and so on are connected in the same manner as the above, and thus the description is not repeated.

NL20 of N-th unit 10#N, which is unit 10 at the bottom of the figure, is connected to NL2 of power conversion device 1.

In unit 10, first cell terminals 104 of cells 100 are connected in parallel. The above configuration renders a voltage applied to DC terminal 11 equal to a voltage applied to each of first cell terminals 104 of cells 100.

More specifically, PL10 of unit 10#1 is connected to PL100 of each of cells 100#1 to 100#M. Similarly, NL10 of unit 10#1 is connected to NL100 of each of cells 100#1 to 100#M.

In unit 10, DC terminals 105 of cells 100 are connected in series. A current flowing through DC terminal 12 is equal to a current flowing through each of DC terminals 105 of cells 100.

More specifically, PL 20 of unit 10#1 and PL 200 of cell 100#1 are connected. NL200 of cell 100#1 and PL 200 of cell 100#2 are connected, thereby connecting cell 100#1 and cell 100#2. In the following, cell 100#2 and so on are connected in the same manner as the above, and thus the description is not repeated.

NL20 of unit 10#N at the bottom of the figure is connected to NL2 of power conversion device 1, and NL200 of cell 100#M included in unit 10#N.

Power conversion device 1 further includes an auxiliary converter 20. Auxiliary converter 20 converts DC voltages having different voltages. In this case, auxiliary converter 20 is connected of DC terminals 11 of adjacent two units 10, and transmits and receives power between these two DC terminals 11. For example, in the figure, auxiliary converter 20 is connected between DC terminals 11 of unit 10#1 and 10#2.

In the following, description will be given with reference to auxiliary converter 20 being connected to first unit terminals 11. However, auxiliary converter 20 may be connected to second unit terminals 12. In this case, a control unit 300 controls voltages of second unit terminals 12.

More specifically, positive electrode power supply line PL10 of unit 10#1 is connected to a positive electrode power supply line APL10 of auxiliary converter. Negative electrode power supply line NL10 of unit 10#1 is connected to a negative electrode power supply line ANL10 of auxiliary converter 20. The above configuration connects NL10 of unit 10#1 to PL10 of unit 10#2 via auxiliary converter 20.

Positive electrode power supply line PL10 of unit 10#2 is connected to a positive electrode power supply line APL20 of auxiliary converter 20. Negative electrode power supply line NL10 of unit 10#2 is connected to a negative electrode power supply line ANL20 of auxiliary converter 20. The above configuration connects PL10 of unit 10#1 to NL10 of unit 10#2 via auxiliary converter 20.

As shown in FIG. 1, DC terminals 2 and 3 of power conversion device 1, DC terminals 11 and 12 of unit 10 (may be referred to as "both unit terminals"), DC terminals 104 and 105 of cell 100 (may be referred to as "both cell terminals"), and auxiliary converter 20 each have a positive terminal and a negative terminal. Here, unless otherwise stated, a voltage between the positive terminal and the negative terminal will be referred to as a voltage of the terminal.

Figure 3:
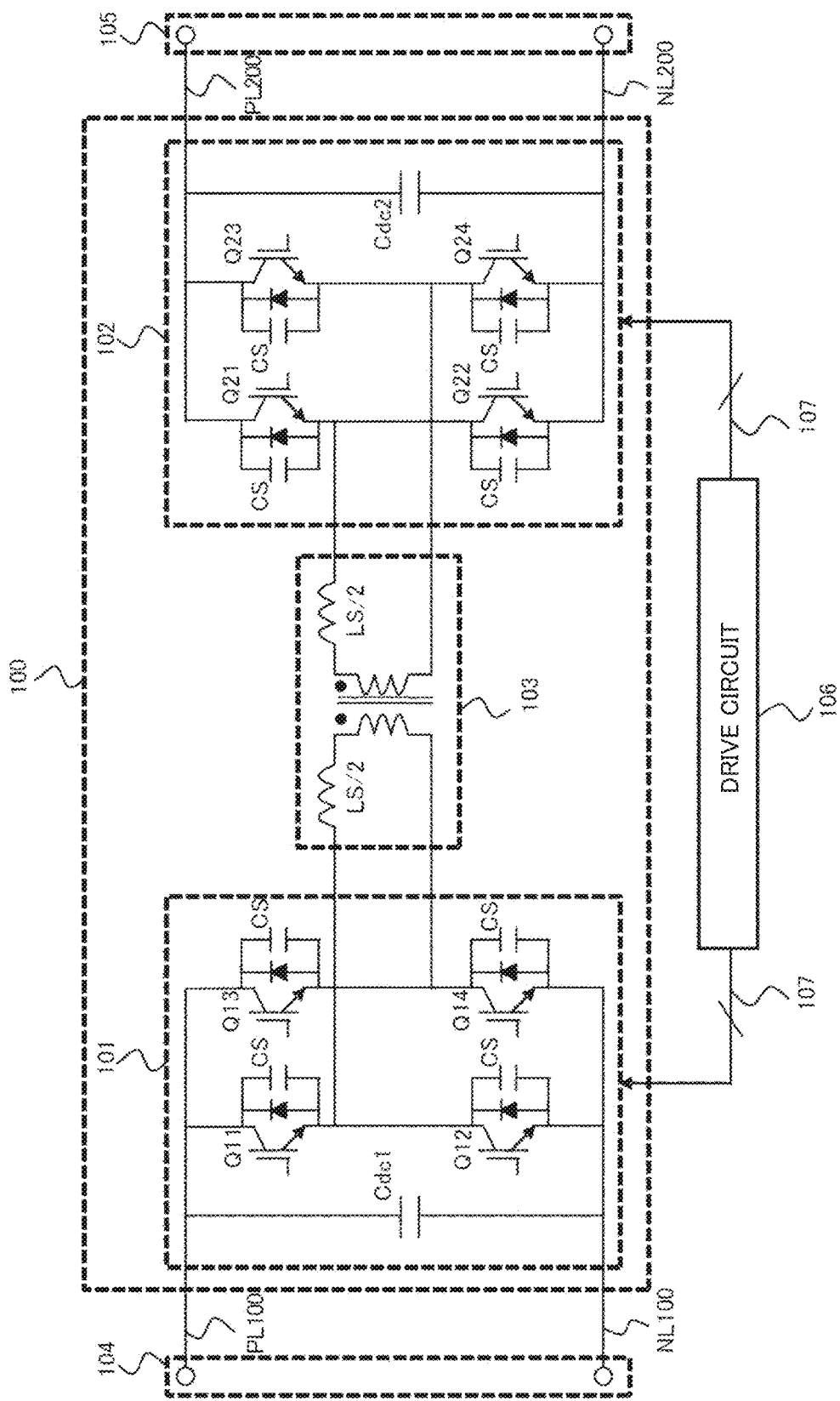
FIG. 3 is one example of a circuit diagram of the cell, according to Embodiment 1 of the present invention.

FIG. 3 is one example of a circuit diagram of cell 100 according to Embodiment 1. Cell 100 is a circuit which converts a voltage $V_{Cin}$ of DC terminal 104 on the primarily side of cell 100 to a voltage $V_{Cout}$ of DC terminal 105 on the secondary side of cell 100, and can control the bi-directional power conversion in any manner. Cell 100 includes a first full-bridge circuit 101, a second full-bridge circuit 102, a transformer 103, and a drive circuit 106.

First full-bridge circuit 101 includes two switching legs and a DC capacitor Cdc1. One of the two switching legs includes semiconductor switching elements Q11 and Q12, and the other one includes semiconductor switching elements Q13 and Q14.

Similarly, second full-bridge circuit 102 includes two switching legs and a DC capacitor Cdc2. One of the two switching leg includes semiconductor switching elements Q21 and Q22, and the other includes semiconductor switching elements Q23 and Q24. DC capacitor Cdc2 is connected in parallel to DC terminal 105.

Moreover, a midpoint connection of each switching leg in first full-bridge circuit 101 is connected to the primarily side of transformer 103, and a midpoint connection of each switching leg in second full-bridge circuit 102 is connected to the secondary side of transformer 103.

The winding turns ratio of the secondary-side coil of transformer 103 to the primary-side coil of transformer 103 is tailored to the ratio of the voltage of DC terminal 105 to the voltage of DC terminal 104. For example, when the input voltage is 3 kV and the output voltage is 6 kV, the winding turns ratio of transformer 103 is 1:2. Note that, in the following description, voltage $V_{Cin}$ of DC terminal 104 is voltage $V_{Cout}$ of DC terminal 105 in the winding turns ratio of the transformer.

For example, semiconductor switching elements having a self turn-off function, such as IGBTs (Insulated Gate Bipolar Transistor) having an antiparallel diode, are used as semiconductor switching elements Q11 to Q24 included in both full-bridge circuits 101 and 102. Semiconductor switching elements Q11 to Q24 may be combined in parallel, depending on a current capacity.

Drive circuit 106 generates a gate signal 107 for each of semiconductor switching elements Q11 to Q24 within cell 100 to control the switching of each of semiconductor switching elements Q11 to Q24. Controlling the switching of each of semiconductor switching elements Q11 to Q24 causes first full-bridge circuit 101 to output an AC voltage V1 to the primarily side winding of transformer 103 and second full-bridge circuit 102 to output an AC voltage V2 to the secondary side winding of transformer 103.

A snubber capacitor CS is connected in parallel to each of semiconductor switching elements Q11 to Q24. Due to the effects of snubber capacitor CS and an inductance LS of an AC output line, zero voltage switching is allowed, which is the soft switching of each of semiconductor switching elements Q11 to Q24. Consequently, switching losses in semiconductor switching elements Q11 to Q24 can be reduced, increasing the operating frequencies of these elements, thereby allowing a size reduction of transformer 103. Here, the soft switching is a technique which utilizes a resonance phenomenon to reduce the voltage or current that is applied to a semiconductor switching element during a switching transition, thereby reducing the switching losses and electromagnetic noise. The above inductance LS may be a leakage inductance of transformer 103.

DC capacitors Cdc1, Cdc2 are each configured of, for example, an electrolytic capacitor or a film capacitor. A high-frequency current flows through DC capacitors Cdc1, Cdc2. If DC capacitors Cdc1, Cdc2 are film capacitors, DC capacitors Cdc1, Cdc2 can be suppressed from being deteriorated by the high-frequency current, thereby extending the life of capacitors Cdc1, Cdc2.

Note that the configuration of cell 100 shown in FIG. 3 is by way of example. Any DC-to-DC conversion device that includes a bridge circuit is within the scope of the present invention. For example, while FIG. 3 illustrates the cell terminals being connected in parallel on the first full-bridge circuit 101 side, and the cell terminals being connected in series on the second full-bridge circuit 102 side, the parallel connection side and the series connection side may be reversed. In other words, the parallel connection may be formed on the first side, which is one of input and output, and the series connection may be formed on the second side, which is the other one of the input and output.

Figure 4:
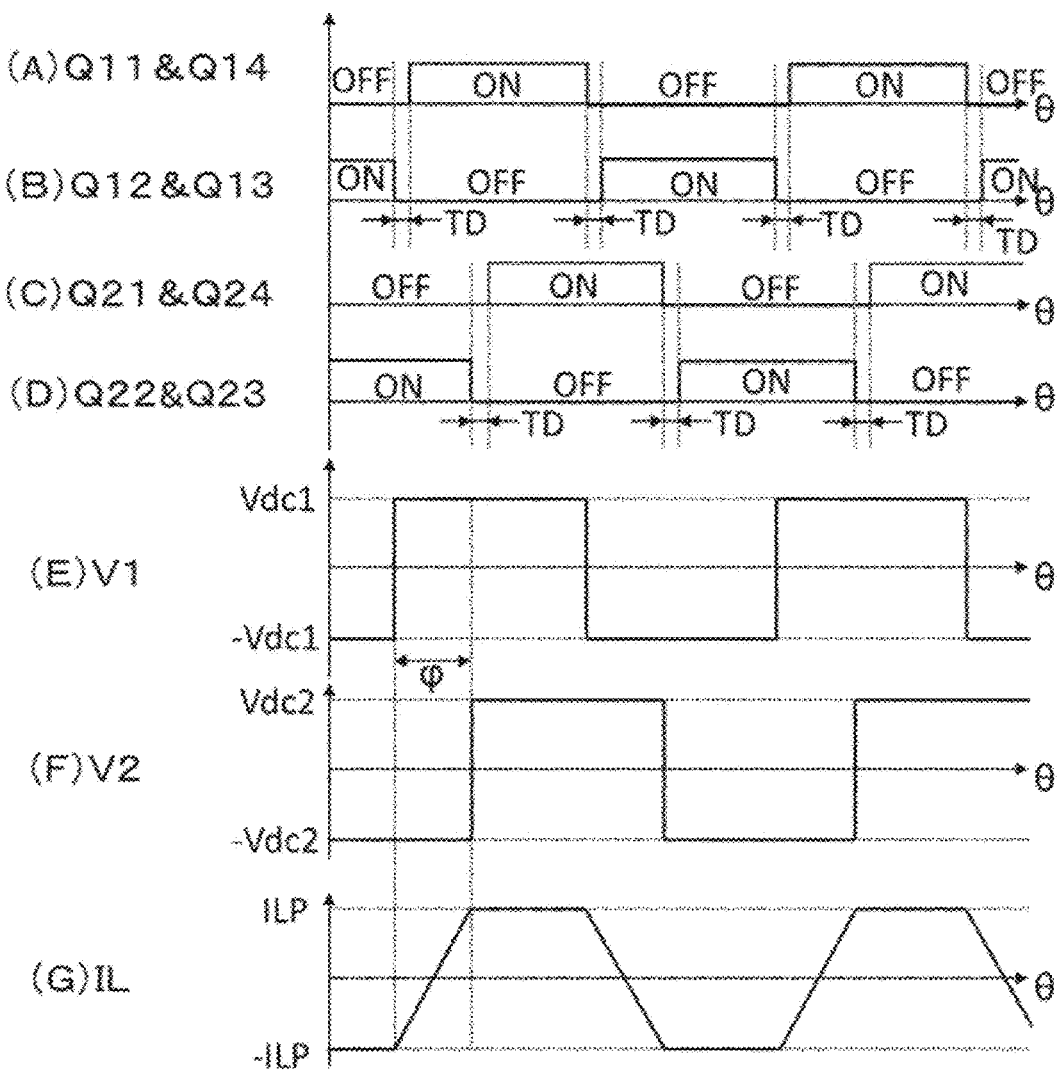
FIG. 4 is a diagram of operating waveforms of the cell, according to Embodiment 1 of the present invention.

FIG. 4 is a diagram of operating waveforms of cell 100 according to Embodiment 1. In the figure, (A) depicts operating waveforms of switching elements Q11 and Q14, (B) depicts operating waveforms of switching elements Q12 and Q13, (C) depicts operating waveforms of switching elements Q21 and Q24, and (D) depicts operating waveforms of switching elements Q22 and Q23. Note that TDs denoted in (A) to (D) of the figure each indicate a dead time which is provided to prevent the semiconductor switching elements within the switching leg from being short-circuited.

In FIG. 4, (E) depicts AC voltage V1 output from first full-bridge circuit 101, (F) depicts AC voltage V2 output from second full-bridge circuit 102, and (G) depicts a current IL which flows through each cell 100.

As shown in (E) and (F) of the figure, there is a phase difference φ between AC voltage V1 and AC voltage V2. In cell 100, phase difference φ is controlled, thereby controlling the transmission power.

If operating frequencies of semiconductor switching elements Q11 to Q24 are increased (for example, 61 Hz or higher) in order to reduce the size of transformer 103, the loss of transformer 103 increases. However, use of an amorphous core material for transformer 103 can inhibit an increase of the loss caused by the increased frequency.

Figure 5:
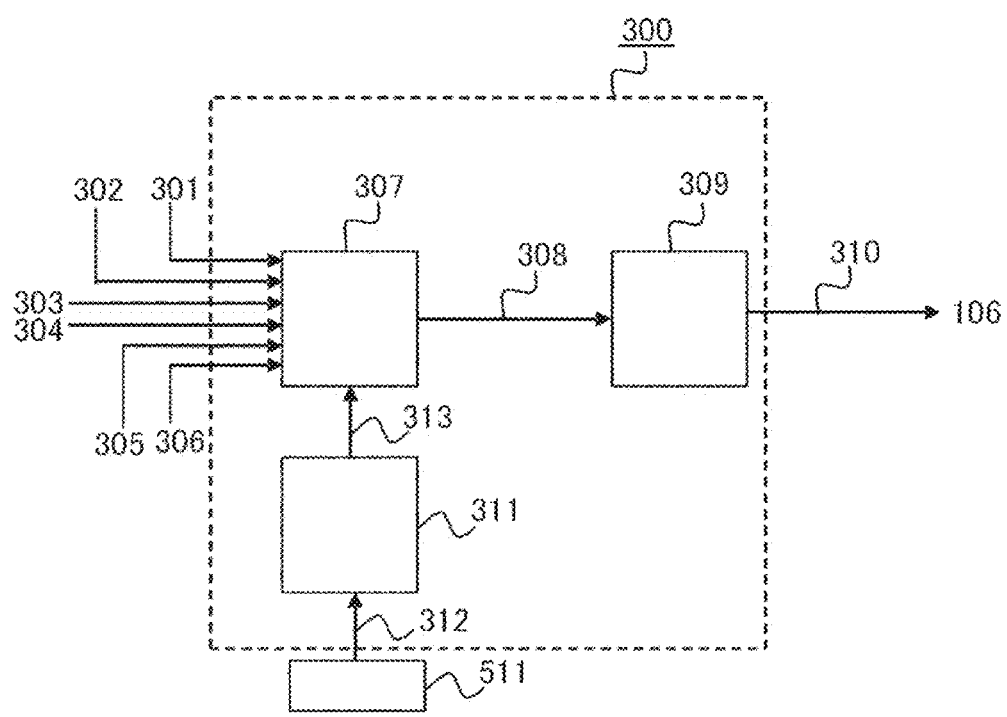
FIG. 5 is a block diagram of a control unit according to Embodiment 1 of the present invention.

Power conversion device 1 includes control unit 300. FIG. 5 is a block diagram of control unit 300 according to Embodiment 1. Control unit 300 includes a control operation unit 307, a pulse width modulation (PWM) signal generation unit 309, and a fail-count counter 311.

Control operation unit 307, included in control unit 300, calculates a control command value 308, using at least one of the following pieces of voltage information. For example, when no failed cell is sensed (in normal operation), control operation unit 307 calculates control command value 308 so that voltage detection value 304 of second unit terminal 12 is close to a target voltage. If a failed cell is sensed (in the event of cell failure), control operation unit 307 calculates control command value 308, based on the target voltage and a failed cell count m.

The voltage information contains a voltage detection value 301 of first DC terminal 2, a voltage detection value 302 of second DC terminal 3, a voltage detection value 303 of first unit terminal 11, a voltage detection value 304 of second unit terminal 12, a voltage detection value 305 of first cell terminal 104, and a voltage detection value 306 of second cell terminal 105. Note that the voltage information is not limited to the above example, and the number of voltage detection values and the types of the voltage detection values used by control operation unit 307 may be changed as appropriate, depending on a terminal whose voltage needs to be controlled.

PWM signal generation unit 309 generates a PWM signal 310, using control command value 308 calculated by control operation unit 307. The generated PWM signal 310 is transmitted to drive circuit 106 (shown in FIG. 3).

Fail-count counter 311 receives a cell failure signal 312, which is transmitted from a short-circuit sensing unit 511 described below with reference to FIG. 6, keeps a failed cell count 313, and transmits failed cell count 313 to control operation unit 307.

Figure 6:
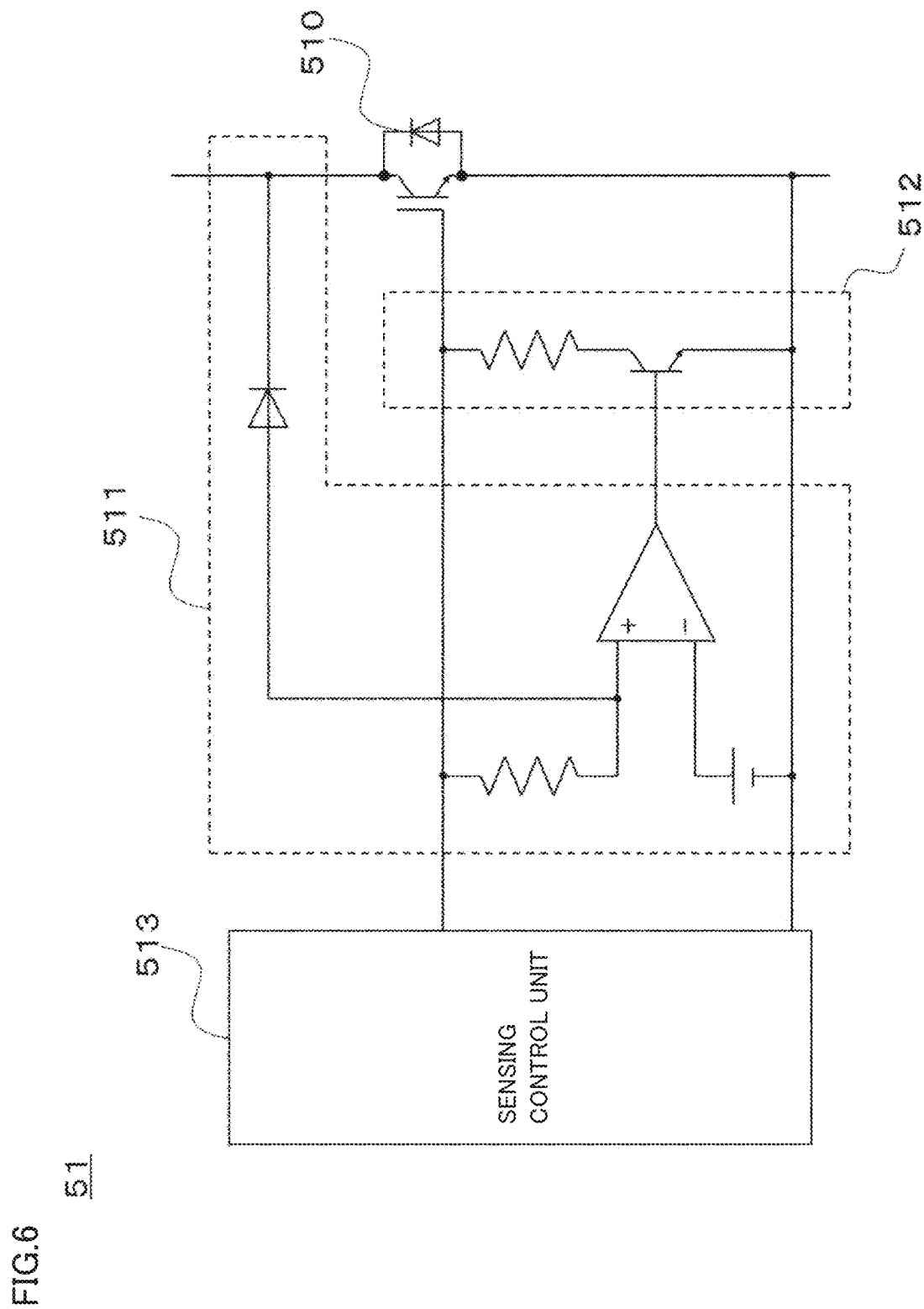
FIG. 6 is a circuit diagram illustrating a sensing unit according to Embodiment 1 of the present invention.

FIG. 6 is a circuit diagram illustrating a sensing unit 51, in particular, a circuit diagram illustrating details of short-circuit sensing unit 511 which senses the short-circuit current, described with reference to FIG. 3, and its peripheral circuits.

Sensing unit 51 includes a semiconductor device 510, short-circuit sensing unit 511, which senses the short-circuit current, and an interruption unit 512 which interrupts semiconductor device 510 when short-circuit sensing unit 511 senses the short-circuit current.

Sensing unit 51 further includes a sensing control unit 513. Sensing control unit 513 activates or deactivates short-circuit sensing unit 511 by inputting an on signal or an off signal to short-circuit sensing unit 511.

Here, sensing unit 51, shown in FIG. 6, is provided corresponding to both full-bridge circuits 101 and 102 of cell 100. Sensing unit 51 may be provided for each of switching elements Q11 to Q24 included in both full-bridge circuits 101 and 102.

When an on signal is input to semiconductor device 510, short-circuit sensing unit 511 senses whether the collector potential is greater than or equal to a given voltage, thereby sensing presence or absence of a short-circuit current. If short-circuit sensing unit 511 senses a short-circuit current, short-circuit sensing unit 511 outputs a short-circuit sensed signal to interruption unit 512. Short-circuit sensing unit 511 also outputs cell failure signal 312 to fail-count counter 311.

As the short-circuit sensed signal is input from short-circuit sensing unit 511, interruption unit 512 interrupts semiconductor device 510 through larger resistance than when interrupting semiconductor device 510 in a steady state operation. This interruption implements soft interruption in which a surge voltage occurred upon the interruption is suppresses suppressed.

Figure 7:
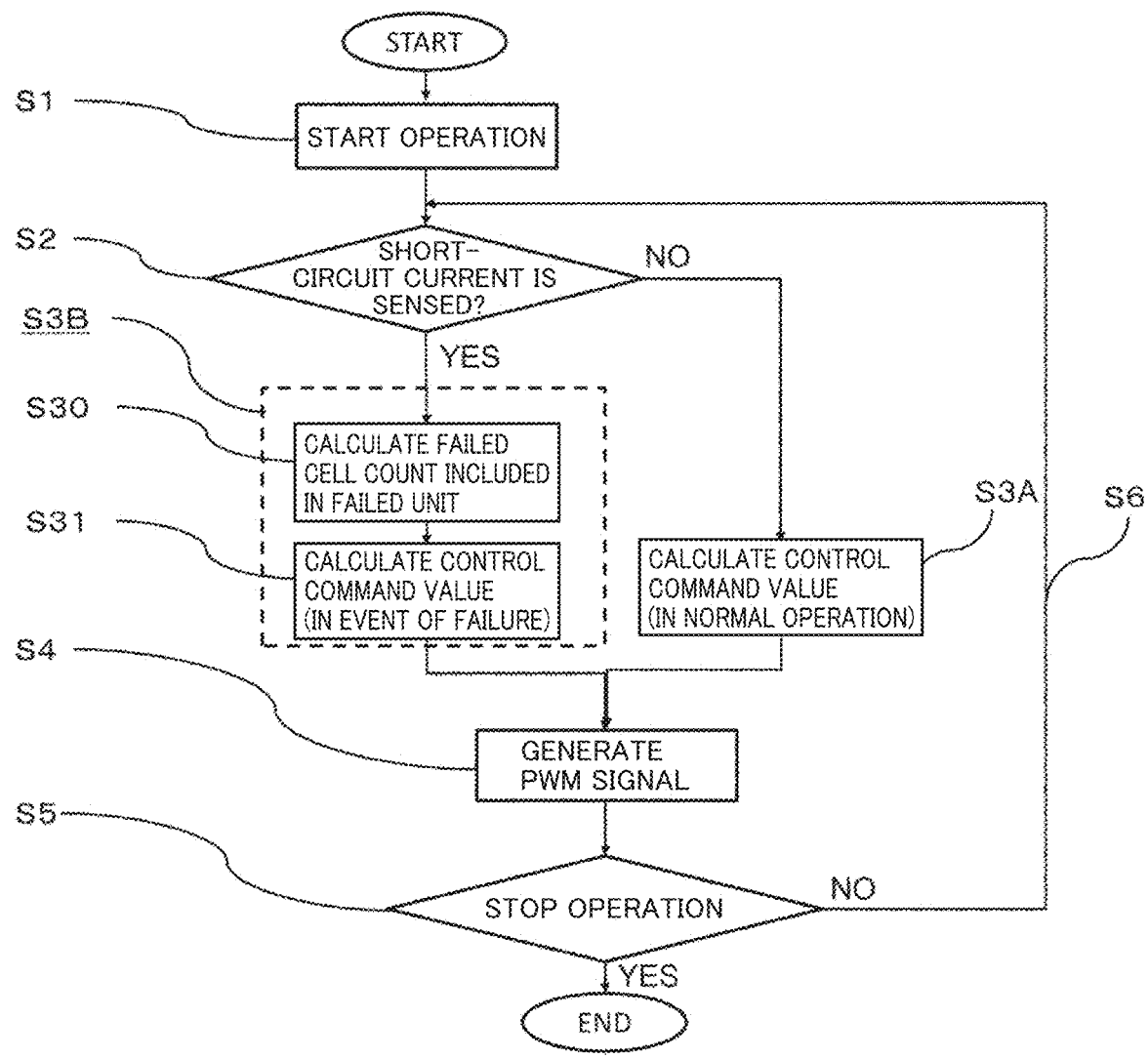
FIG. 7 is a flowchart diagram of the control unit according to Embodiment 1 of the present invention.

Here, an operation of control unit 300 is described with reference to FIG. 7. FIG. 7 is a flowchart diagram for control unit 300 according to Embodiment 1 of the present invention.

Initially, in response to an external command, control unit 300 starts the operation of power conversion device 1 (step S1).

Next, fail-count counter 311 determines whether cell failure signal 312 is input from short-circuit sensing unit 511, thereby sensing the presence or absence of a failed cell (step S2).

If cell failure signal 312 is input (YES) in step S2, fail-count counter 311 proceeds to step S3B, and short-circuit device 200 associated with the failed cell is controlled so that the short-circuit device 200 is closed. Here, semiconductor switching elements Q11 to Q14 included in first full-bridge circuit 101 are all turned off, thereby disconnecting the failed cell from the other cells.

If no cell failure signal 312 is input (NO) in step S2, control operation unit 307 calculates control command value 308 for the normal operation of power conversion device 1 (step S3A).

Step S3B includes step S30 and step S31. Initially, using cell failure signal 312, fail-count counter 311 keeps failed cell count 313 for a unit that includes the failed cell 100 (hereinafter, also referred to as a failed unit) (hereinafter, also referred to as a failed unit) (step S30).

Next, failed cell count 313 is output to control operation unit 307. Using failed cell count 313, control operation unit 307 calculates control command value 308 in the event of cell failure (step S31).

Using control command value 308 generated in step S31 or S3A, PWM signal generation unit 309 generates PWM signal 310 (step S4).

Control unit 300 confirms whether a shutdown command is input to power conversion device 1. If a shutdown command is input (YES), control unit 300 stops the operation of power conversion device 1. If the above command is not input (NO), the process returns to step S2. From this point forward, steps S2 through S5 are repeated until a shutdown command is input to power conversion device 1.

On each first unit terminal 11 side, the voltage of each first cell terminal 104 is controlled so that the voltages of first cell terminal 104 are matched before and after the cell failure.

On the second unit terminal 12 side, control unit 300 changes the voltages of second cell terminal 105 before and after the cell failure, based on failed cell count m. For example, if the failed cell count is increased, control unit 300 controls the voltage of second cell terminal 105 so that control command value 308 at second cell terminal 105 after the cell failure is increased, as compared to before the cell failure.

The control of the voltage of second unit terminal 12 is described below in detail. M cells 100 are connected in series before the cell failure, while (M−m) cells 100 are connected in series after the cell failure. Note that cell count m is a natural number less than cell count M.

Consequently, voltage $V_{Cout}$ of second cell terminal 105 before the cell failure is $(V_{Uout}/M)$. Voltage $V''_{Cout}$ of second cell terminal 105 after the failure cell can be represented by:

$$V''_{Cout} = V_{Uout}/(M-m) = V_{Cout} \cdot M/(M-m) \quad (1)$$

With Equation (1), the voltage of second cell terminal 105 is controlled so that voltage $V''_{Cout}$ of second cell terminal 105 after the cell failure is M/(M−m) times the voltage $V_{Cout}$ of second cell terminal 105 before the failure.

Here, as a result of careful study, the inventor has found that the following problem is caused if the voltage of first cell terminal 104 is also controlled in the event of a cell failure, as with second cell terminal 105. In other words, the power on the first cell terminal 104 side of cell 100 (hereinafter, may be referred to as an "input power of cell 100") does not match the power on second cell terminal 105 side (hereinafter, may be referred to as an "output power of cell 100"), rendering the power conversion device 1 unable to continue the operation.

The above-mentioned problem is now described, with reference to a configuration, as Comparative Example, in which the voltage of first cell terminal 104 is also controlled, as with second cell terminal 105 as described above.

Current $I''_{Cin}$ flowing through first cell terminal 104 of a healthy cell can be represented by:

$$I''_{Cin} = I_{Uin}/(M-m) = I_{Cin} \cdot M/(M-m) \quad (2)$$

where $I_{Uin}$ denotes the current of a semiconductor switching element before failed, and $I''_{Uin}$ denotes the current of first unit terminal 11 after the failure.

Since the number of cells 100 connected in parallel to first unit terminal 11 of a failed unit decreases from M cells to (M−m) cells, current $I''_{Cin}$ after the cell failure is (M/(M−m)) times the current $I_{Cin}$ before the cell failure, as shown in the above equation.

In contrast, the currents flowing into second unit terminal 12 are equal before and after the cell failure, and the currents of second cell terminal 105 are also equal before and after the cell failure.

In other words, while the current of second cell terminal 105 is controlled so as to be equal before and after the cell failure, the current of first cell terminal 104 cannot be controlled to be equal before and after the cell failure, ending up having different values.

In other words, the current of first cell terminal 105 after the cell failure is (M/(M−m)) times the current of first cell terminal 105 before the cell failure.

Note that, as described above, in Comparative Example, the voltage of first cell terminal 104 after the cell failure is controlled to be (M/(M−m)) times the voltage of first cell terminal 104 before the cell failure, and the voltage of second cell terminal 105 after the cell failure is also controlled to be (M/(M−m)) times the voltage of second cell terminal 105 before the cell failure.

Accordingly, after the cell failure, the power of first cell terminal 104 (the input power) and the power of second cell terminal 105 (the output power) do not match.

In the present embodiment, the cell terminals are controlled responsive to the failed cell count so that the input power and the output power of cell 100 are matched, thereby avoiding the above problem. Here, "control so that the input power and the output power are matched" specifically refers to (i) the control command values for the voltages of first cell terminal 104 on the first unit terminal 11 side being equal before and after the cell failure and (ii) calculating, based on failed cell count m, the control command value for the voltage of second cell terminal 105 on the second unit terminal 12 side so that the voltages of second cell terminal 105 on the second unit terminal 12 side are equal before and after the cell failure.

From the standpoint of simplified test and improved manufacturability, desirably, unit 10 and cell 100 are configured of the same components. Unit 10 and cell 100 can be configured of the same components by equalizing the voltages of the both cell terminals and the voltages of the both unit terminals.

Here, from the above standpoint, Variation is described in which voltages of DC terminals (both unit terminals 11 and 12, and second cell terminal 105) are controlled so that the voltages of the DC terminals are equal.

Specifically, in Variation, the following balance controls (1), (2), and (3) are performed: (1) a unit input voltage balance control, in which the DC voltages of first unit terminals 11 in each unit 10 are equalized; (2) A unit output voltage balance control, in which the DC voltages of second unit terminals 12 in each unit 10 are equalized; and (3) a cell output voltage balance control, in which the DC voltages of second cell terminals 105 of cells 100 within each unit 10 are equalized.

Power PU of each unit 10 is represented by P/N obtained by dividing transmission power P by N (corresponding to the number of units included in power conversion device 1), where P is the transmission power of power conversion device 1. Similarly, power PC of each cell 100 is represented by PU/M obtained by dividing power PU of unit 10 by cell count M of each unit.

In the balance controls, for example, in order to equalize the DC voltages of second unit terminals 12, control operation unit 307 calculates control command value 308 (hereinafter, may be represented as a "control command value" without the reference sign), so that transmission power PU of each unit 10 increases or decreases responsive to the magnitudes of voltage detection values 304 of second unit terminals 12. With this, the voltages of second unit terminals 12 of multiple units 10 are equalized.

The same is true when equalizing the DC voltages of second cell terminals 105. In other words, control operation unit 307 calculates control command value 308 so that transmission power PC of each cell 100 increases or decreases responsive to the magnitudes of voltage detection values 306 of the DC voltages of second cell terminals 105. With this, the DC voltages of second cell terminals 105 are maintained equal.

Here, with the unit input voltage balance control (1) above, voltage $V''_{Uin}$ of first unit terminal 11 of the failed unit is controlled to be equal to voltage $V_{Uin}$ when the failed unit is one of the healthy units before the cell failure. In other words, $V''_{Uin}$ after the cell failure is equal to voltage $V_{Uin}$ before the cell failure. Here, the healthy units refer to units 10, except for the failed unit, among units 10.

Similarly, with the unit output voltage balance control (2), voltage $V''_{Uout}$ of second unit terminal 12 after the cell failure is controlled to be equal to voltage $V_{Uout}$ thereof before the cell failure.

On the second unit terminal 12 side, since cells 100 corresponding to failed cell count m are bypassed, as described above, the number of cells 100 decreases from M to (M−m). Here, with the output voltage balance control (3) above, the voltages of second cell terminals 105 are controlled to be equal. Voltage $V''_{Cout}$ of second cell terminal 105 of healthy cell 100 can be represented by Equation (1).

With the above operations, voltages of second unit terminals 12 of units 10 included in power conversion device 1 are controlled so that the voltages of second unit terminals 12 are equal. Similarly, in unit 10, voltages of second cell terminals 105 of cells 100 are controlled so that the voltages of second cell terminals 105 are equal.

Here, auxiliary converter 20 is connected to first unit terminals 11 to control the voltages of first unit terminals 11. Auxiliary converter 20 controls first unit terminals 11 so that voltages $V_{Uin}$ of first unit terminals 11 are equal.

In order to control first unit terminals 11 so that the DC voltages of first unit terminals 11 are equal, desirably, auxiliary converter 20 is provided. This allows appropriate control of the voltages of first unit terminals 11 even when transmission power PU of unit 10 is used to control the voltages of second unit terminals 12.

Here, input power $P''_{Cin}$ of first cell terminal 104 of a healthy cell can be represented by:

$$P''_{Cin} = I''_{Cin} \times V''_{Cin} = (I_{Uin}/(M-m)) \times V_{Cin} \quad (3)$$

The current flowing through second cell terminal 105 of the healthy cell remains unchanged even after the semiconductor switching element is failed. Consequently, power $P''_{Cout}$ output from second cell terminal 105 of the healthy cell can be represented by:

$$P''_{Cout} = I''_{Cout} \times V''_{Cout} = I_{Cout} \times (V_{Uout}/(M-m)) \quad (4)$$

Furthermore, with the circuit structure of power conversion device 1 shown in FIG. 1, the relationships, represented by the following equations, arise.

$$V''_{Uout} = V''_{Cin} \times (M-m) = V_{Cin} \times (M-m) \quad (5)$$

$$I''_{Uout} = I''_{Uin}/(M-m) = I_{Uin}/(M-m) \quad (6)$$

$$I''_{Cout} = I''_{Uout} \quad (7)$$

Note that, as described above, $V_{Cout}$ is the voltage of $V_{Cin}$ in the winding turns ratio of the transformer. Assigning Equations (5) through (7) to Equation (4), Equation (8) is derived. In Equation (8), input power $P''_{Cin}$ of first cell terminal 104 of a healthy cell has a value equal to a value of output power $P''_{Cout}$ of second cell terminal 105.

$$P''_{Cout} = (I_{Uin}/(M-m)) \times (V''_{Cin} \times (M-m))/(M-m) = \quad (8)$$
$$I''_{Uin} \times V''_{Cin}/(M-m) = I_{Uin} \times V_{Cin}/(M-m) = P''_{Cin}$$

As described above, distortion in input and output power of each healthy cell 100 can be suppressed by adding the balance controls to power conversion device 1 even after a semiconductor switching element is failed. Furthermore, in power conversion device 1, units 10 can be configured of the same components, and cells 100 can be configured of the same components. As a result, a simplified test and improved manufacturability can be achieved.

Power conversion device 1 can continue the transmission of power even in the event of failure of a semiconductor switching element. Furthermore, there is no need to repair power transmission equipment connected to power conversion device 1 each time a semiconductor switching element is failed, and thus the availability of the power transmission equipment improves. Maintenance cost can also be reduced.

In the present embodiment, while the input voltage and the output voltage of cell 100 are matched by performing the balance controls (1) through (3), the voltage of the second cell terminal of each healthy cell of a failed unit may be controlled responsive to failed cell count m so that the input power and the output power of the healthy cell are equal.

Embodiment 2

In the present embodiment, control operation unit 307 calculates control coefficients, described below, for both unit terminals 11 and 12, and uses the calculated control coefficients to calculate control command value 308.

In healthy units, which are units except for a failed unit, the voltage of first unit terminal 11 and the voltage of second unit terminal 12 are reduced, based on failed cell count m. This reduces the voltages of first unit terminal 11 and second unit terminal 12 of the failed unit, suppressing increases of DC voltages $V_{Cout}$ of second cell terminals 105 in the failed unit.

In the following, description is given with reference to power conversion device 1 continuing the transmission of power using control coefficient $k_1$ and $k_2$. In other words, DC voltage $V_{Cout}$ of second cell terminal 105 of each cell 100 included in the failed unit is multiplied by control coefficient $k_1$, and DC voltage $V_{Cout}$ of second cell terminal 105 of each cell 100 included in the healthy unit is multiplied by control coefficient $k_2$.

Here, control coefficients $k_1$ and $k_2$ are set, based on an overvoltage value of cell 100 whose second cell terminal 105 has a pre-set DC voltage so that control coefficient $k_1$ and $k_2$ are below the overvoltage value, for example.

In Embodiment 1, voltages of the both unit terminals of the failed unit are controlled so that the voltages of the both unit terminals are equal before and after the cell failure. In this case, an increase of failed cell count m increases the voltage $V_{Cout}$ of second cell terminal 105, as shown in Equation (2), and a voltage margin for allowing cell 100 to stably operate cannot be ensured. As a result, voltage $V_{Cout}$ of second cell terminal 105 exceeds the breakdown voltage of the semiconductor switching element, which further increases failed cell count m, rendering the power conversion device 1 unable to continue the transmission of power.

In the present embodiment, the voltage control is performed on both unit terminals 11 and 12 so that the voltages of the unit terminals are reduced less than before the cell failure.

Voltage $V''_{Cout}$ and current $I''_{Cout}$ of second cell terminal 105 of a healthy cell included in a failed unit can be represented by:

$$(V''_{Cout} \text{ within failed unit}) = V_{Cout} \times k_1 \tag{9}$$

$$(I''_{Cout} \text{ within failed unit}) = I_{Cout} \tag{10}$$

The power output to second cell terminal 105 of the healthy cell included in the failed unit is $k_1$ times the power before the cell failure.

In contrast, the current of first cell terminal 104 of the healthy cell of the failed unit is $M/(M-m)$ times the current before the cell failure. Here, since voltages of the terminals are controlled so that the input power and the output power of cell 100 are matched, a voltage $V''_{Cin}$ of first cell terminal 104 after the cell failure can be represented by:

$$(V''_{Cin} \text{ within failed unit}) = V_{Cin} \times [(M-m)/M] \times k_1 \tag{11}$$

Setting the voltage $V''_{Cin}$ of first cell terminal 104 of the healthy cell as indicated by Equation (11) yields the input power of cell 100 $k_1$ times the input power before the cell failure, as with the output power of cell 100.

Output voltage $V''_{Uout}$ of the failed unit can be represented by:

$$V''_{Uout} = (M-m) \times V_{Cout} \times k_1 \tag{12}$$

From Equation (12), it is seen that the output voltage $V''_{Uout}$ of the failed unit is $[(M-m) \times k_1]/M$ times the output voltage before the failure.

In contrast, voltage $V''_{Cout}$ and current $I''_{Cout}$ of second cell terminal 105 of cell 100 included in the healthy unit can be represented by:

$$(V''_{Cout} \text{ within healthy unit}) = V_{Cout} \times k_2 \tag{13}$$

$$(I''_{Cout} \text{ within healthy unit}) = I_{Cout} \tag{14}$$

As shown in Equations (13) and (14), the power output from cell 100 included in the failed unit to second cell terminal 105 is $k_2$ times the power before the failure.

In contrast, the currents of first cell terminal 104 of the healthy unit are equal before and after the cell failure. In order to match the input power and the output power of cell 100, voltage $V''_{Cin}$ of first cell terminal 104 within the healthy unit needs to be controlled by:

$$V''_{Cin} = V_{Cin} \times k_2 \tag{15}$$

Here, voltage $V''_{Cin}$ of first cell terminal 104 is $k_2$ times the voltage before the cell failure.

From the foregoing, it is seen that $k_2$ is the control coefficient by which the input voltage and the output voltage of cell 100 are multiplied in the healthy unit.

Here, considering the fact that the summation of voltages $V_{Uin}$ of first unit terminals 11 and the summation of voltages $V_{Uout}$ of second unit terminals 12 are equal before and after the failure of the semiconductor switching element, the following relationship arises:

$$N \times V_{Cin} = \{(N-n) \times k_2 + [(M-m)/M] \times k_1\} \times V_{Cin} \tag{16}$$

where N denotes the number of units and n denotes the number of failed units.

Rearranging Equation (16), $k_1$ can be represented, using $k_2$, by:

$$k_1 = [N - (N-n) \times k_2] \times [M/(M-m)] \tag{17}$$

Note that control operation unit 307 may be provided for each unit 10. In this case, fast calculation of the control coefficient is allowed, improving the stability and reliability in the control.

The above configuration allows power conversion device 1 to continue the transmission of power even in the event of failure of a semiconductor switching element. Furthermore, there is no need to repair power transmission equipment each time a semiconductor switching element is failed, and thus the availability of the power transmission equipment improves. Maintenance cost can also be reduced.

While Embodiment 2 is described with reference to using two control coefficients, the present invention is not limited thereto. The number of control coefficients may depend on the failed cell count. Moreover, while the control command value is calculated based on the control coefficients, the control command value may be directly calculated, without the calculation of the control coefficients.

Embodiment 3

In Embodiment 2, the control is performed to protect terminals 104 and 105 of cell 100 from overvoltage when failed cell count m is increased.

The present embodiment is different from Embodiment 2 in that the control command value is determined based on a current maximum value $I_{LP}$. Specifically, the control command value is determined so that current maximum value $I_{LP}$ is less than a pre-set value.

As a method of determination of the control command value, initially, current maximum values $I_{LP}$ are calculated for different multiple control command values. Next, current maximum value $I_{LP}$ that takes the minimum value is selected from among the calculated current maximum values $I_{LP}$. Last, the voltages of the both cell terminals 104 and 105 are controlled with a control command value corresponding to the selected current maximum value $I_{LP}$.

For a failed unit having cell count M and failed cell count m, current maximum value $I_{LP}$ of each cell 100 can be derived by Equation (18). It is seen that current maximum value $I_{LP}$ of cell 100 is determined in this equation, based on failed cell count m, and the control coefficient for the DC terminal after a failure of a semiconductor switching element. Note that in the equation, $L_S$ denotes an inductance and $\omega$ denotes an angular frequency.

$$I_{LP} = \frac{V_{Cin}}{2\omega L_s} \left[ 2\phi k_1 + \frac{m(\pi k_1 - 2\phi)}{M} \right] \tag{18}$$

Note that, in Equation (18), phase difference φ is not limited to the transmission power of power conversion device 1, and may be a value when the rated power is transmitted. Such a configuration obviates the need for the information about the transmission power of power conversion device 1, enabling a simple configuration of the control operation unit.

Figure 8:
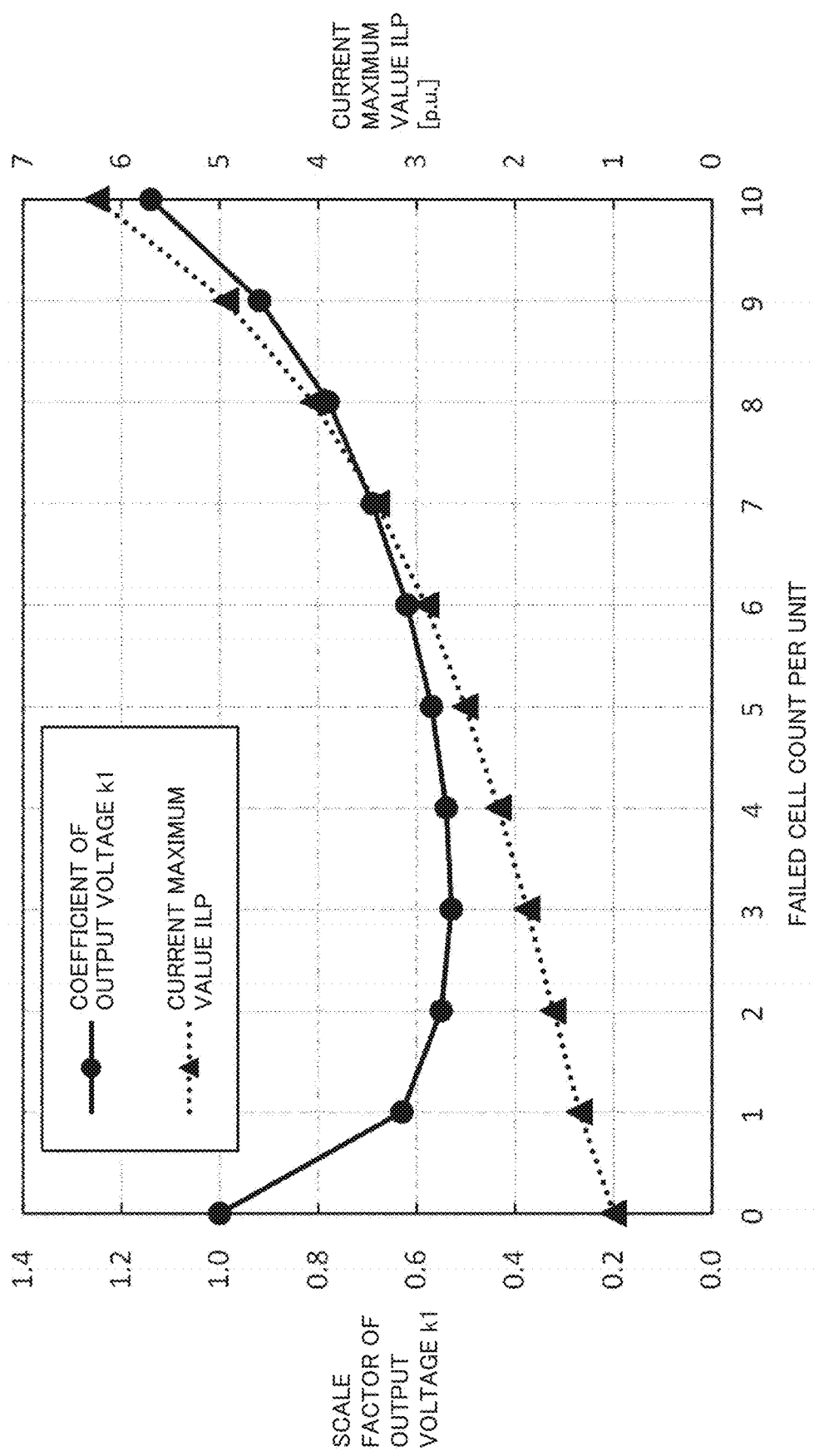
FIG. 8 is a diagram illustrating one example relationship of a failed cell with a current maximum value and a control coefficient, according to Embodiment 3 of the present invention.
Figure 10:
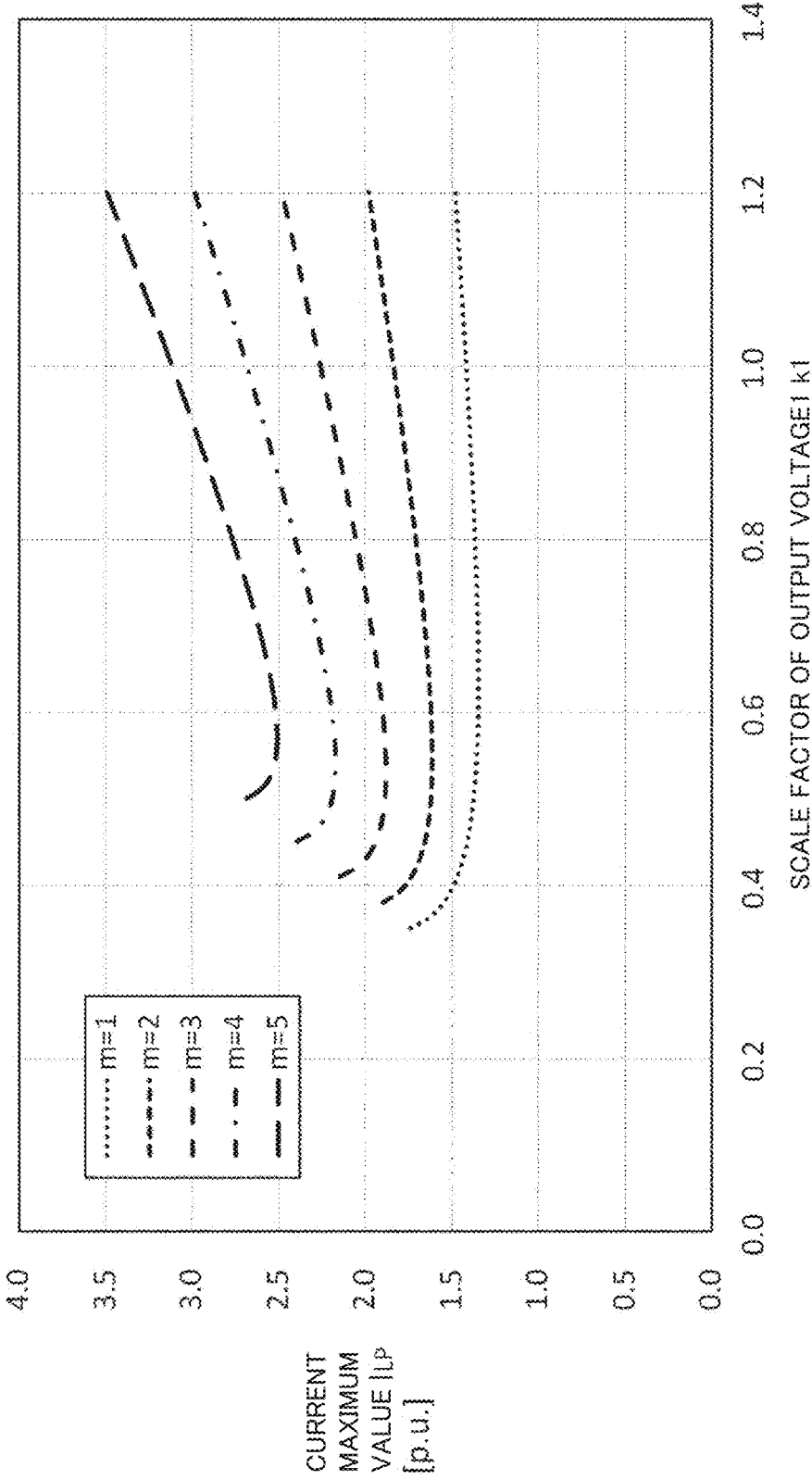
FIG. 10 is a diagram illustrating one example relationship of a current maximum value and a control coefficient for an output voltage for each failed cell count m, according to Embodiment 5 of the present invention.
Figure 11:
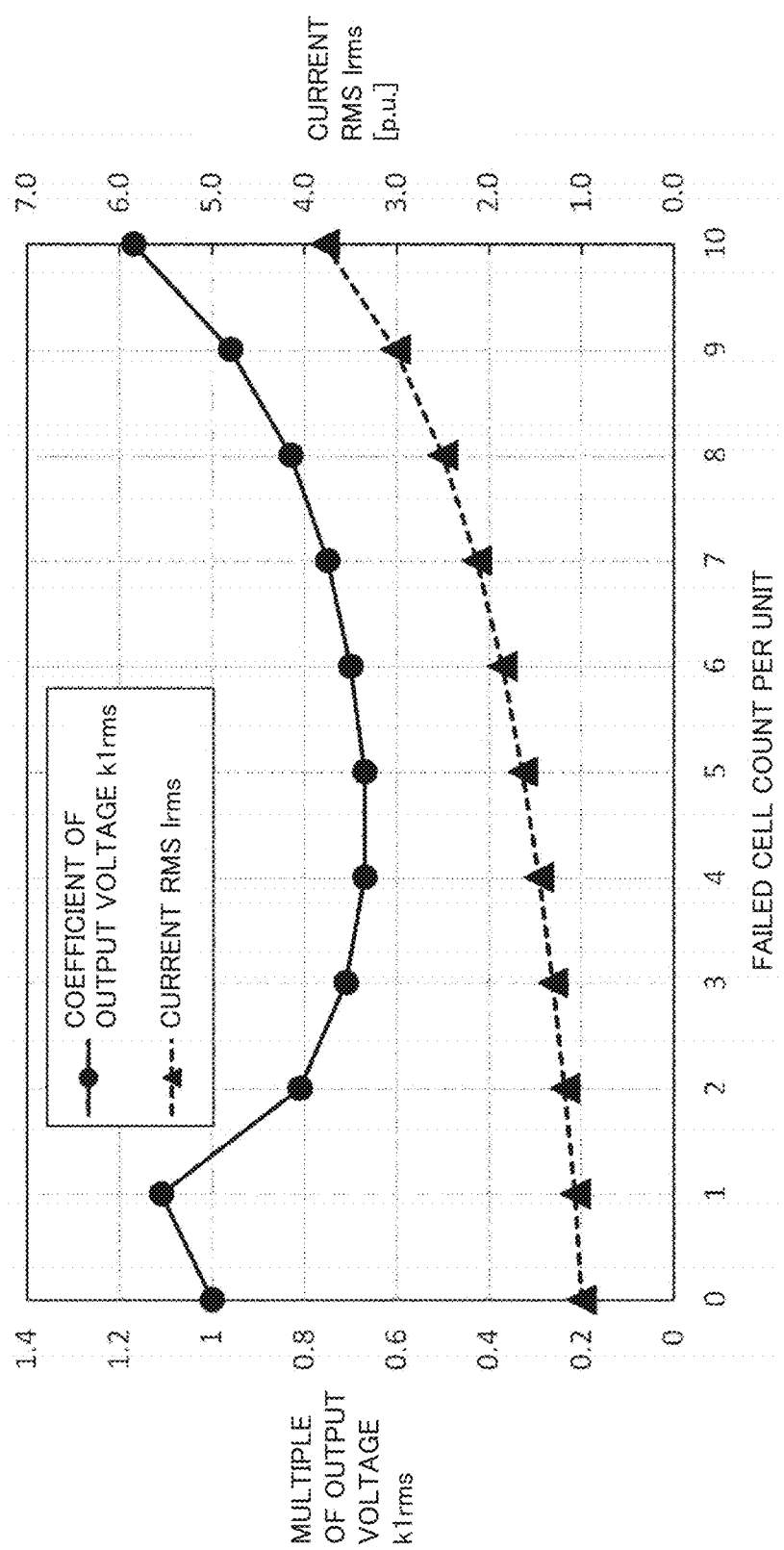
FIG. 11 is a diagram illustrating one example relationship of a current RMS and a control coefficient for an output voltage for each failed cell count m, according to Embodiment 6 of the present invention.

FIG. 8 is a diagram showing a control command value ($k_1 \times V_{Cout}$) that yields minimum current maximum value $I_{LP}$ relative to failed cell count m included in the failed unit, and current maximum value $I_{LP}$ for that control command value. Note that in the figure, when failed cell count m=0, current maximum value $I_{LP}$ is calculated with $k_1$=1, and the scale factor as a function of each failed cell count m is calculated for current maximum value $I_{LP}$ using current maximum value $I_{LP}$ where m=0 as a reference. Note that in FIG. 8, cell count M in unit 10 is 14. Cell count M is the same for FIGS. 10 and 11 shown below.

Initially, the control operation unit calculates a change in current maximum value $I_{LP}$ for each failed cell count m with varying control coefficient $k_1$. Next, the control operation unit determines control coefficient $k_1$ so that the calculated current minimum value $I_{LP}$ is minimum.

Here, advantageous effects of the present embodiment are now described. The use of control coefficient $k_1$ or $k_2$ according to Embodiment 2 may cause the following problem, resulting from an increase of failed cell count m or the control coefficient settings for the healthy unit. In other words, a voltage difference between first cell terminal 104 and second cell terminal 105 (hereinafter, may be referred to as "cell input-to-output voltage difference") may increase in the healthy cell that is included in the failed unit, as compared to before the cell failure.

Figure 9:
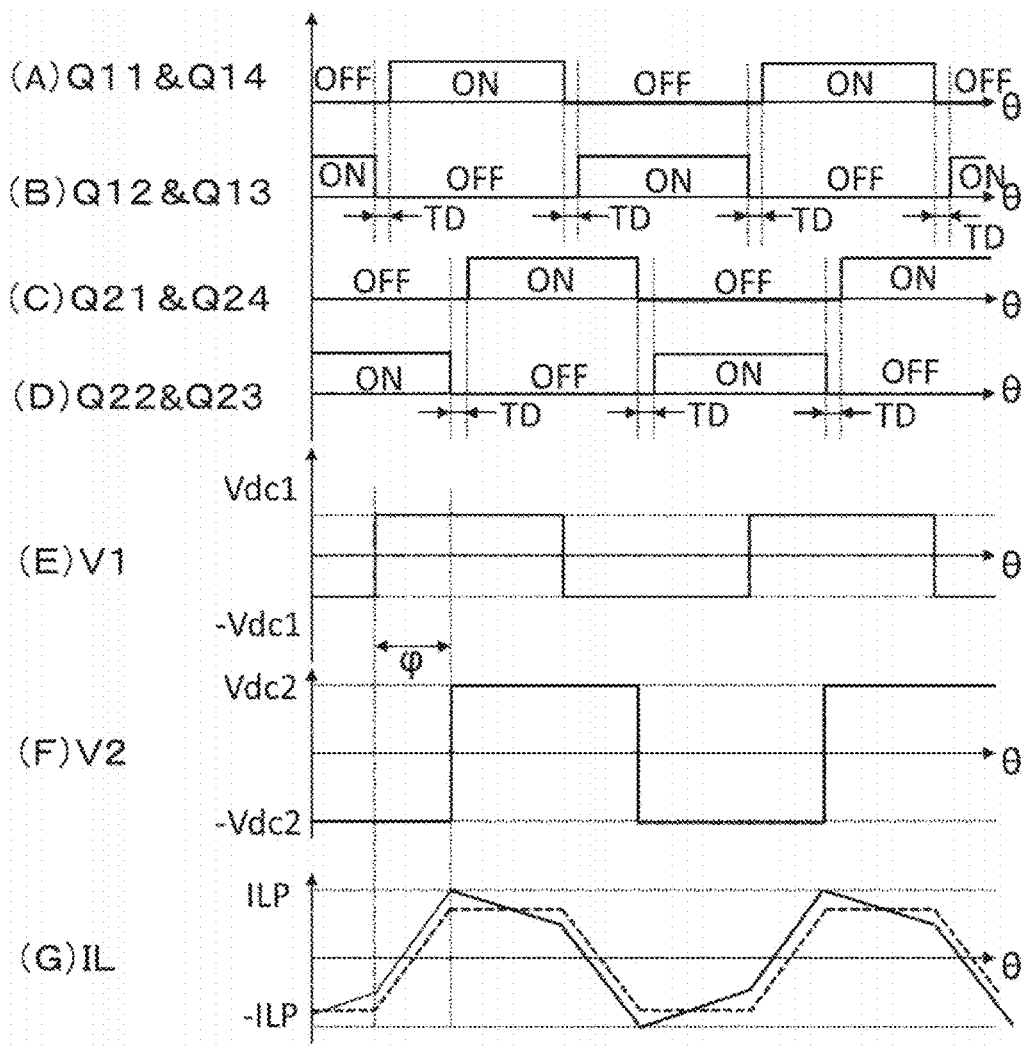
FIG. 9 is an illustration about operating waveforms of a cell according to Embodiment 3 of the present invention.

Here, the relationship between the increase of the above cell input-to-output voltage difference and the increase of the current in cell 100 is described with reference to FIG. 9 (in particular, (G) of the figure). FIG. 9 is an illustration about operating waveforms of the cell according to Embodiment 3 of the present invention.

Part (G) of FIG. 9 shows two current waveforms having different cell input-to-output voltage differences. Specifically, among the two current waveforms in the figure, the current waveform that is indicated by the solid line has a greater cell voltage difference than the current waveform that is indicated by the dotted line. As shown in (G) of FIG. 9, it is seen that the maximum value of the current waveform indicated by the solid line is greater than the current waveform indicated by the dotted line.

As such, when the voltage difference between first cell terminal 104 and second cell terminal 105 increases, the maximum value of the current increases. As a result, the power loss increases in cell 100 and an excessive current flows into cell 100, exceeding the allowed current value of the semiconductor switching element, which may end up with a failure of the semiconductor switching element. In order to prevent such a failure, the power conversion device often has an overcurrent protection shutdown functionality which shuts down the circuit operation when the current flowing through the semiconductor switching element exceeds a pre-set threshold.

Having the overcurrent protection shutdown functionality as mentioned above, power conversion device 1 shuts down the operation when a current that exceeds the above threshold is caused. As a result, power conversion device 1 has a reduced reliability.

In the present embodiment, the control command value is calculated so that the magnitude of current maximum value $I_{LP}$ is less than or equal to the pre-set threshold. Thus, the shutdown of power conversion device 1, mentioned above, can be prevented.

Note that control operation unit 307 may previously derive the relationship between $k_1$ and current maximum value $I_{LP}$ that yields minimum current maximum value $I_{LP}$ relative to failed cell count m, and store the derivation in a lookup table. In this case, control coefficient $k_1$ as a function of failed cell count m can be selected from the lookup table.

Such a configuration obviates the need for a tremendous amount of calculation by the control operation unit, enabling a simple configuration of the control operation unit.

Note that since no failed cell is present in the healthy unit, there is no need for control operation unit 307 to newly calculate the control command value ($k_2 \times V_{Cout}$). Accordingly, power conversion device 1 can continue the transmission of power with $k_2$=1, that is, with the same control command value as before the cell failure.

Furthermore, in the present embodiment, the voltage value ($k_1 \times V_{Cout}$) that yields minimum current maximum value $I_{LP}$ relative to failed cell count m is used to calculate the control command value for the output voltage. The input voltage is calculated by Equation (11). However, the present invention is not limited to the above example. Control coefficient $k_1$ may be calculated for the input voltage that yields minimum current maximum value $I_{LP}$ relative to failed cell count m, using this, the control command value may be calculated, and the output voltage may be calculated from the relationship between the input power and the output power of cell 100. The same is true for the following description.

Embodiment 4

In Embodiment 3, power conversion device 1 continues the transmission of power with the control command value ($k_1 \times V_{Cout}$) where current maximum value $I_{LP}$ of each cell 100 in the failed unit is minimum, thereby suppressing an increase in loss and avoiding the overcurrent protection shutdown.

The present embodiment is different from the above embodiment in that when power conversion device 1 continues the transmission of power with the control command value ($k_1 \times V_{Cout}$) described in Embodiment 3, units 10, other than the failed cell, share the voltage reduced as compared to the voltage before the cell failure.

When power conversion device 1 continues the transmission of power with the control command value ($k_1 \times V_{Cout}$), described in Embodiment 3, for the failed unit, output voltage difference ΔV, which is the voltage of power conversion device 1, can be represented by:

$$\Delta V = \Sigma V_{Uout} - \Sigma(k_1 \times V_{Uout}) \tag{19}$$

Note that, in Equation (19), the first term on the right-hand side is the summation of the output voltages of multiple units 10 before a failed cell is sensed. The second term on the right-hand side is the summation of the output voltages of multiple units 10 when the healthy cell is controlled with control coefficient $k_1$. Stated differently, output voltage difference ΔV (a second voltage difference) is calculated as follows. In other words, provided that a value obtained by adding up the voltages of second unit terminals 12 included in multiple units 10 is a second summation voltage, a reduction in the second summation voltage when the healthy cell is controlled with the control command value, relative to the second summation voltage before the failure is sensed, is calculated as output voltage difference ΔV.

In the following, description is given with reference to power conversion device 1 continuing the transmission of power with the same voltage as before the failure of a semiconductor switching element by units 10 evenly sharing output voltage difference ΔV that can be calculated by Equation (19). However, the present invention is not limited to the above example. If output voltage difference ΔV is greater than a pre-set value, the voltage of second unit terminal 12 may be controlled so that output voltage difference ΔV is reduced by increasing the voltage command value for the healthy unit greater than before a failed cell is sensed and increasing the control command value for the healthy cells included in the failed unit.

Here, $V_{Uoutb}$, which is voltage of second unit terminal 12 in the failed unit, can be represented by:

$$V_{Uoutb}=k_1 \times V_{Uout}+(\Delta V/N) \quad (20)$$

A control command value for allowing the failed unit to continue the transmission of power with voltage $V_{Uoutb}$ shown in Equation (20), is obtained by multiplying voltage $V_{Uoutb}$ by a control coefficient $k_{1n}$ derived by:

$$k_{1n}=k_1+[\Delta V/(N \times V_{Uout})] \quad (21)$$

In contrast, $V_{Uouth}$, which is voltage of second unit terminal 12 in the healthy unit, can be represented by:

$$V_{Uouth}=V_{Uout}+(\Delta V/N) \quad (22)$$

The control coefficient for allowing the healthy unit to continue the transmission of power with voltage $V_{Uouth}$ shown in Equation (22), is obtained by multiplying voltage $V_{Uouth}$ by $k_2$ derived by:

$$k_2=1+[\Delta V/(N \times V_{Uout})] \quad (23)$$

Referring to FIG. 9, advantageous effects of the present embodiment are now described. FIG. 9 is a diagram illustrating one example relationship of a failed cell with the control coefficient and the current maximum value, according to Embodiment 3 of the present invention. As shown in FIG. 9, $k_1$<1 when the failed cell count is 1 to 9. This suggests that if power conversion device 1 continues the transmission of power in this state, the voltages of both DC terminals 2, 3, after the failure of a semiconductor switching element, decreases less than before the failure.

As the voltage of power conversion device 1 decreases, the voltage of the grid decreases. In general, in the grid, the loss caused by the transmission wire is suppressed by increasing the voltage and reducing the current. Accordingly, an insufficient transmission voltage caused by the reduction in voltage of power conversion device 1 can lead to an increase in loss of the grid.

In the present embodiment, in contrast, the control operation unit calculates the control command values multiplied by $k_{1n}$ and $k_2$, which can be calculated by Equations (21) and (23).

The above configuration described above reduces output voltage difference ΔV, thereby suppressing an increase in loss at the grid, and a low-loss power system is thus feasible.

Note that, instead of controlling the second unit terminal 12 so that output voltage difference ΔV of second unit terminal 12 before and after the cell failure is reduced, an input voltage difference (a first voltage difference) of first unit terminal 11 before and after the cell failure may be shared among multiple units.

Here, the "input voltage difference" is calculated as a reduction of a first summation voltage (the summation of the voltages of the first unit terminals of multiple units 10) when the healthy cell is controlled with the control command value, from a first summation voltage before the failed cell is sensed. The same is true for Embodiment 5 described below.

Embodiment 5

In Embodiment 4, all the units 10 included in power conversion device 1 share the reduction of the voltage resulting from cell failure.

In contrast, a control operation unit according to the present embodiment is different from Embodiment 4 in that the units, except for a heavily failed unit which is a failed unit having a largest failed cell count m, share the reduction of the voltage. While the following description is given with reference to the heavily failed unit being a unit that has a largest failed cell count m, it should be noted that the heavily failed unit may be a unit that has a greater number of failed cells than a pre-set number.

FIG. 10 is a diagram illustrating one example of a relationship of current maximum value $I_{LP}$ and a control coefficient (in the figure, labeled as "OUTPUT VOLTAGE SCALE FACTOR") $k_1$ for the output voltage for each failed cell count m, according to Embodiment 5 of the present invention.

As shown in FIG. 10, the greater the failed cell count m is, the greater the change in current maximum value $I_{LP}$ relative to the change in control coefficient $k_1$ for the output voltage, in particular, in the range of m≥2.

Accordingly, if more than one failed unit are present, and one of the failed units has a large failed cell count m (m≥2), the control coefficient for the output voltage changes. As a result, current maximum value $I_{LP}$ significantly increases.

Thus, in the present embodiment, the heavily failed unit, whose current maximum value $I_{LP}$ is expected to increase, does not share the reduction of the voltage in power conversion device 1, as mentioned above. This configuration yields an advantageous effects of suppressing an increase in the current maximum value in the heavily failed unit.

At this time, in contrast to Equation (20), $V_{Uoutb}$, which is voltage of DC terminal 12 included in the failed unit, can be represented by:

$$V_{Uoutb}=k_1 \times V_{Uout}+[\Delta V/(N-n_s)] \quad (24)$$

where $n_s$ denotes a total number of heavily failed units among a total number of failed units.

Accordingly, control coefficient $k_{1n}$ for allowing the failed unit to continue the transmission of power with voltage $V_{Uoutb}$ shown in Equation (24) can be derived by:

$$k_{1n}=k_1+\{\Delta V/[(N-n_s) \times V_{Uout}]\} \quad (25)$$

Meanwhile, $V_{Uouth}$, which is voltage of the DC terminal in the healthy unit, can be represented by:

$$V_{Uouth}=V_{Uout}+[\Delta V/(N-n_s)] \quad (26)$$

Control coefficient $k_2$ for allowing the healthy unit to continue the transmission of power with voltage $V_{Uouth}$ shown in Equation (26) can be derived by:

$$k_2=1+\{\Delta V/[(N-n_s) \times V_{Uout}]\} \quad (27)$$

The above configuration suppresses an increase of current maximum value $I_{LP}$ in a heavily failed unit that has a large failed cell count m, and the present embodiment thus yields an advantageous effect of implementing a highly reliable, low-loss power conversion device, in addition to the advantageous effects of Embodiment 4.

Embodiment 6

The control operation unit according to Embodiment 4 selects the control command value, based on current maximum value $I_{LP}$. In contrast, the present embodiment is different from Embodiment 4 in that the control command value is selected based on a current RMS (Root Mean Square) $I_{Lrms}$ in the present embodiment.

More specifically, the control command value is selected so that current RMS $I_{Lrms}$ is less than a pre-set value. As a method of selection of the control command value, for example, current RMSs $I_{Lrms}$ for different multiple control command values are calculated, and a control command value that corresponds to minimum current RMS $I_{Lrms}$, among the calculated current RMSs $I_{Lrms}$, is selected.

For a failed unit having cell count M and failed cell count m, current RMS $I_{Lrms}$ for each cell 100 can be derived by:

$$I_{Lrms} = \sqrt{\frac{1}{\pi}\left[\begin{array}{c}\frac{(A^2-B^2)\phi^3}{3}+(AI_{L0}+B^2\pi+BI_{LP})\phi^2+\\(I_{L0}^2-B^2\pi^2-2BI_{LP}\pi-I_{LP}^2)\phi+\frac{B^2\pi^3}{3}+I_{LP}^2\pi+BI_{LP}\pi^2\end{array}\right]} \quad (28)$$

where A, B, and $L_{L0}$, in Equation (28), are defined by Equations (29), (30) and (31).

$$A = \frac{V_{cin}+V_{cout}}{\omega L} = \frac{k_{1rms}}{\omega L}\left[\frac{M-m}{M}V_{cin}+V_{cout}\right] \quad (29)$$

$$B = \frac{V_{cin}-V_{cout}}{\omega L} = \frac{k_{1rms}}{\omega L}\left[\frac{M-m}{M}V_{cin}-V_{cout}\right] \quad (30)$$

$$I_{L0} = -\frac{A\phi+B(\pi-\phi)}{2\omega L} \quad (31)$$

Moreover, $I_{LP}$ in Equation (28) denotes a current maximum value, which is defined by Equation (18). Equation (28) suggests that current RMS $I_{Lrms}$ of cell 100 depends on failed cell count m and the control coefficient for the voltages of the both cell terminals after a semiconductor switching element is failed.

Note that, in Equation (28), phase difference φ is not limited to the transmission power of power conversion device 1, and may be a value when power conversion device 1 transmits a rated power. Such a configuration obviates the need for the information about the transmission power of power conversion device 1, enabling a simple configuration of the control operation unit.

FIG. 11 illustrates current RMS $I_{Lrms}$ when a control command value is used, the control command value being generated from a control coefficient $k_{lrms}$ for a voltage that yields minimum current RMS $I_{Lrms}$ relative to failed cell count m in a failed unit. In the figure, a scale factor (current RMS) of the output power is indicated on the vertical axis, and failed cell count m per unit is indicated on the horizontal axis. Note that, in FIG. 11, when failed cell count m=0, the voltage is calculated with $k_1$=1, and the above "OUTPUT POWER SCALE FACTOR" is calculated as a function of each failed cell count m using current RMS $I_{Lrms}$ when m=0 as a reference.

Initially, the control operation unit calculates current RMS $I_{Lrms}$ for each failed cell count m with varying control coefficient $k_1$. A corresponding control coefficient $k_1$ is then selected, based on a magnitude of current RMS $I_{Lrms}$ among the calculated current RMSs $I_{Lrms}$. Here, for example, control coefficient $k_1$ that yields minimum current RMS $I_{Lrms}$ is selected.

Since the capacity of the power transmission equipment depends on the multiplication of the voltage RMS and the current RMS, the above configuration can suppress an increase of RMS $I_{Lrms}$ of current IL in the failed unit. Consequently, a size reduction of power conversion device 1 is allowed.

Note that the control operation unit may previously derive current RMS $I_{Lrms}$ and $k_1$ that yields minimum current RMS $I_{Lrms}$ for each failed cell count m, and the derivation may be stored in a storage unit (not shown) in the form of a lookup table. In this case, the control operation unit uses the lookup table to select control coefficient $k_1$ as a function of failed cell count m. Such a configuration allows reduction in the computational complexity by the control operation unit, enabling a simple configuration of the control operation unit.

Note that since no failed cell is present in the healthy unit, there is no need for the control operation unit to calculate control coefficient $k_2$, and the healthy unit may continue the transmission of power with $k_2$=1.

Alternatively, as described in Embodiment 4, the transmission of power may be continued, while units 10 included in power conversion device 1 sharing the reduction of the transmission voltage.

As described in Embodiment 5, a failed unit having a largest failed cell count m may be defined as a heavily failed unit, and the heavily failed unit may continue transmission of power with the control command value ($k_{lrms} \times V_{Cout}$) that yields minimum current RMS $I_{Lrms}$, and the units, other than the heavily failed unit, may continue the transmission of power, while sharing the reduction of voltage.

The embodiments according to the present invention can be combined in any manner, or modified or omitted as appropriate, within the scope of the invention.

The presently disclosed embodiments should be considered as illustrative in all aspects and do not limit the present invention. The scope of the present invention is defined by the appended claims, rather than by the above description of the embodiments. All changes which come within the meaning and range of equivalency of the appended claims are intended to be embraced within their scope.

REFERENCE SIGNS LIST

1 power conversion device; 2 first DC terminal; 3 second DC terminal; 10 unit; 11 DC terminal (first unit terminal); 12 DC terminal (second unit terminal); 20 auxiliary converter; 100 DC-to-DC converter cell; 104 DC terminal (first cell terminal); 105 DC terminal (second cell terminal); 200 short-circuit device; and 300 control unit.

The invention claimed is:

1. A power conversion device that includes a unit between a first terminal and a second terminal, and transmits a power between the first terminal and the second terminal, the unit including a plurality of DC-to-DC converter cells, the first terminal being located on a first side, the second terminal being located on a second side, the first side being one of an input and an output, the second side being configured as an input when the first side is the output, the second side being configured as an output when the first side is the input, the power conversion device comprising:

a short-circuit device that short-circuits a failed cell which is a failed DC-to-DC converter cell among the plurality of DC-to-DC converter cells; and a control circuit that controls the plurality of DC-to-DC converter cells, wherein the unit has a first unit terminal on the first side of the unit and a second unit terminal on the second side of the unit, the plurality of DC-to-DC converter cells, included in the unit, have first cell terminals connected in parallel to the first unit terminal of the unit, and second cell terminals connected in series to the second unit terminal of the unit, the first cell terminals being on the first side, the second cell terminals being on the second side, when the failed cell is sensed in the unit, the control circuit calculates a control command value for a voltage of the second cell terminal based on a failed cell count so that a power of the first cell terminal and a power of the second cell terminal are matched in a healthy cell which is a DC-to-DC converter cell, except for the failed cell, among the plurality of DC-to-DC converter cells.

2. The power conversion device according to claim 1, wherein the control command value is calculated, based on a target voltage for the second cell terminal, and the sensed failed cell count, wherein the target voltage is set before the failed cell is sensed.

3. The power conversion device according to claim 1, wherein the control circuit includes a lookup table storing a correspondence between the control command value and the failed cell count, and uses the lookup table to calculate the control command value corresponding to the failed cell count.

4. The power conversion device according to claim 1, wherein the control circuit calculates the control command value so that a summation of voltages of the second cell terminals of healthy cells included in the unit that includes the failed cell, is matched with a summation of voltages of the second cell terminals included in the unit before the failed cell is sensed.

5. The power conversion device according to claim 1, wherein the control command value is calculated so that a current maximum value or a current RMS of the healthy cell is less than a pre-set value.

6. The power conversion device according to claim 1, comprising a plurality of units comprising the unit, wherein first unit terminals of the plurality of units are connected in series to the first terminal, and second unit terminals of the plurality of units are connected in series.

7. The power conversion device according to claim 6, wherein voltages of the first unit terminals are controlled so that the voltages of the first unit terminals are matched, voltages of the second unit terminals are controlled so that the voltages of the second unit terminals are matched, and voltages of the second cell terminals are controlled so that the voltages of the second cell terminals are matched.

8. The power conversion device according to claim 6, wherein the control circuit:

calculates, as a first voltage difference, a reduction of a first summation voltage when the healthy cell is controlled with the control command value, from the first summation voltage before the failed cell is sensed; and calculates, as a second voltage difference, a reduction of a second summation voltage when the healthy cell is controlled with the control command value, from the second summation voltage before the failed cell is sensed, wherein the first summation voltage is a summation of voltages of the first unit terminals of the plurality of units, and the second summation voltage is a summation of voltages of the second unit terminals of the plurality of units.

9. The power conversion device according to claim 8, wherein the control circuit reduces the second voltage difference by increasing the control command value for the healthy cell included in a failed unit which is a unit that includes the failed cell, and increasing a voltage command value for healthy units that are units, except for the failed unit, among the plurality of units.

10. The power conversion device according to claim 9, wherein the control circuit does not increase the control command value for a heavily failed unit, wherein the heavily failed unit is the failed unit that has the failed cell count greater than a pre-set setting value.

11. The power conversion device according to claim 9, wherein the control circuit reduces the first voltage difference by increasing a voltage command value for the first unit terminals of the plurality of units.

12. The power conversion device according to claim 1, wherein the control circuit includes a fail-count counter that increments for each failed cell that is sensed in the unit, and the control circuit calculates the control command value for the voltage of the second cell terminal based on the failed cell count stored in the fail-count counter.

* * * * *